United States Patent [19]

Peart et al.

[11] Patent Number: 5,716,562

[45] Date of Patent: Feb. 10, 1998

[54] METHOD FOR MAKING INJECTION-MOLDED, FOAMED, STRUCTURAL PLASTIC, COMPOSITE-MATERIAL SKATEBOARD

[75] Inventors: Stephen Peart, Los Gatos; Timothy C. Piumarta, Soquel, both of Calif.

[73] Assignee: NHS Incorporated, Santa Cruz, Calif.

[21] Appl. No.: 561,878

[22] Filed: Nov. 22, 1995

Related U.S. Application Data

[62] Division of Ser. No. 308,591, Sep. 19, 1994, abandoned.

[51] Int. Cl.$^6$ .............................. B29C 44/04; B62M 1/00
[52] U.S. Cl. .................. 264/45.3; 264/45.5; 264/54; 264/DIG. 17; 280/87.042
[58] Field of Search ..................... 264/45.3, 45.5, 264/54, DIG. 17; 280/87.042

[56] References Cited

U.S. PATENT DOCUMENTS

| | | | |
|---|---|---|---|
| 3,414,919 | 12/1968 | Gust | 441/74 |
| 3,644,168 | 2/1972 | Bonk et al. | 264/41 |
| 4,073,840 | 2/1978 | Saidla | 264/45.3 |
| 4,248,931 | 2/1981 | Salman | 428/315 |
| 4,337,963 | 7/1982 | Stevenson | 280/610 |
| 4,399,085 | 8/1983 | Belbin et al. | 264/41 |
| 4,479,998 | 10/1984 | Belbin et al. | 428/220 |
| 4,549,920 | 10/1985 | Cogswell et al. | 156/181 |
| 4,559,262 | 12/1985 | Cogswell et al. | 428/294 |
| 4,713,032 | 12/1987 | Frank | 441/74 |
| 4,766,031 | 8/1988 | Kohl | 428/317.9 |
| 4,798,549 | 1/1989 | Hirsch | 441/74 |
| 4,836,814 | 6/1989 | Bambara et al. | 441/65 |
| 4,850,913 | 7/1989 | Szabad, Jr. | 441/65 |
| 4,897,063 | 1/1990 | Scheurer et al. | 441/68 |
| 4,940,629 | 7/1990 | Weber et al. | 428/213 |
| 5,019,450 | 5/1991 | Cogswell et al. | 428/402 |
| 5,032,096 | 7/1991 | Scott et al. | 441/74 |
| 5,128,202 | 7/1992 | Subramanian et al. | 428/318.6 |
| 5,213,889 | 5/1993 | Cogswell et al. | 428/332 |
| 5,320,378 | 6/1994 | Wiig | 280/600 |
| 5,507,985 | 4/1996 | Cadorniga | 264/45.3 |

*Primary Examiner*—William Watkins
*Attorney, Agent, or Firm*—Kolisch, Hartwell, Dickinson, McCormack & Heuser

[57] ABSTRACT

A unitary, monocoque, injection-molded skateboard (and method of making the same) which is characterized by an elongate composite body with a specific gravity in the range of about 0.75 to about 0.8, and including a foamed structural plastic mass having a distributed differentiated density, and contained within that mass, plural, elongate strands of reinforcing carbon fibre material.

8 Claims, 3 Drawing Sheets

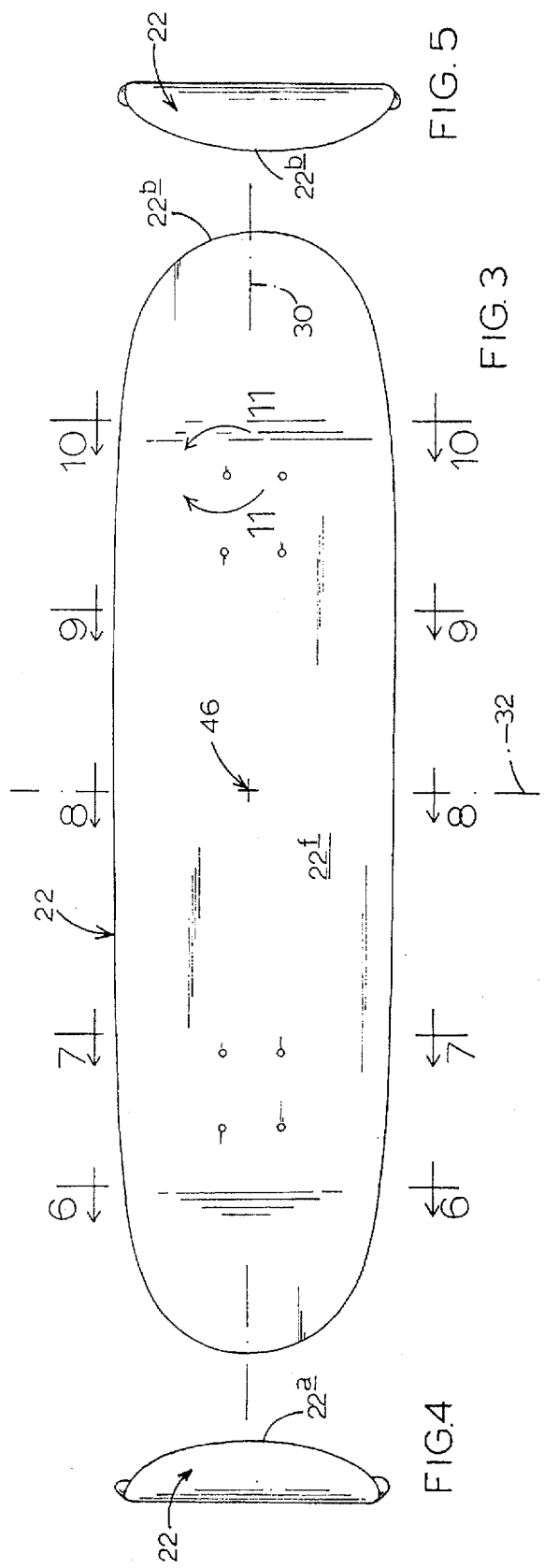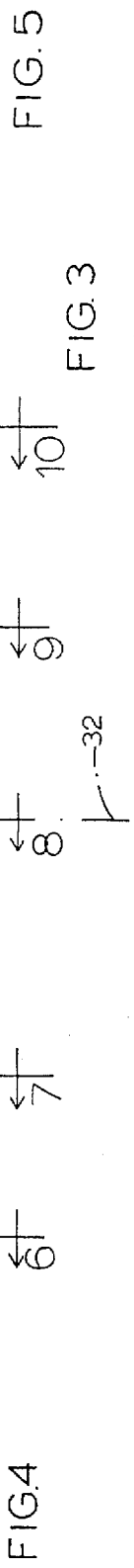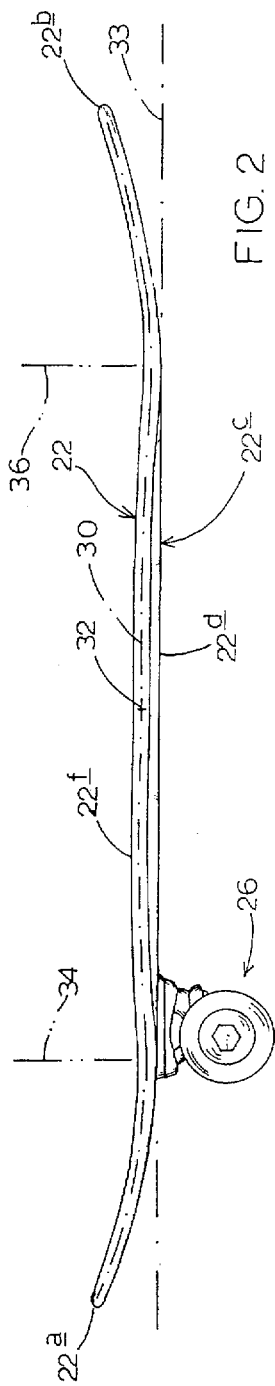

METHOD FOR MAKING INJECTION-MOLDED, FOAMED, STRUCTUAL PLASTIC, COMPOSITE-MATERIAL SKATEBOARD

This is a divisional continuation of application Ser. No. 08/308,591 filed Sep. 19, 1994 ABN.

BACKGROUND AND SUMMARY OF THE INVENTION

This invention relates to a skateboard (and to a method of making the same), and more particularly to a unique, high-pressure, heated-flow, injection-molded skateboard (and in particular a skateboard body) which offers all of the advantages (and many more) of conventional laminated-wood skateboards, while at the same time avoiding essentially all of the known, key and pesky drawbacks and disabilities of such conventional boards. For convenience, the terms "skateboard", "skateboard body" and "body" are used herein interchangeably. The term "assembled skateboard" is employed to refer to the assembly of a skateboard body and the usual two sets of ground-engaging trucks.

Recreational/sporting skateboards have been around for many years, and remain a constantly popular product in the relevant marketplace. It appears that evolutionary development of what is today recognized as the modern, conventional skateboard occurred relatively early in its youth, with this evolution leading to a fairly complicated and expensive, layered/laminated-wood structure having certain well-recognized characteristics of size, resilience, "feel", weight and topographical configuration, including sophisticated compound curvilinearity relative to its longitudinal and transverse axes. Accordingly, the currently "market-preferred" laminated-wood construction has resulted in unquestioned expectations for a skateboard which offers certain commonly-agreed-upon desirable features of resilience, springiness, shock absorbance and maneuverability that are treasured by skateboard enthusiasts.

However, the modern, laminated-wood skateboard also carries with it a number of important drawbacks. For example, the related laminated-wood technology normally employs bonded layers of carefully and specially selected strips of maple which display good performance characteristics, but which, because of maple's exemplary high density in the scale of wood densities, results in a skateboard weight which cannot be reduced significantly other than by unhappily reducing what are believed and recognized to be minimum performance-level-acceptable dimensions, i.e. length, width and thickness. Thus, those who would like to have the opportunity to perform with "high-performance", significantly-reduced-weight skateboards do not really have, today, a viable alternative option.

Laminated-wood skateboards, no matter how well made, when subjected to the typical highly abusive treatment, are subject to severe nicking and damaging in ways that lead to more than simply unsightly disfigurement. In particular, cutting and nicking exposes the interior wood components to the elements, and most significantly to moisture penetration, and this, along with rough treatment, leads frequently to catastrophic delamination, and thus the end of the useful life of such a skateboard. Even where a board that is carefully used does not become significantly nicked, it has typically been drilled through its body to receive mounting hardware that carries the usual two sets of forward and rear ground-engaging trucks, and such a drilling-through operation often leads to a structural weakness that creates a vulnerable fracture zone. Also, drilling-through to some extent exposes wood for water damage due to exposure during normal, varied-weather usage.

Further, laminated-wood skateboards are somewhat time and labor intensive to build, are complicated by the very nature of the lamination fabrication process which is required, and are thus relatively costly.

Additionally, the configurational and perimetral shaping of a conventional laminated-wood board requires machining and bending operations which add to the time-consumptive costliness of conventional board construction.

Given this situation, a general and important object of the present invention is to provide a unique skateboard, and more particularly, a unique skateboard body, which can offer all of the recognized advantages of the highest-level laminated-wood boards, which can indeed offer significantly greater advantages, and which can do all of this in a final product that substantially eliminates all of the troublesome deficiencies and drawbacks just mentioned.

Thus, and according to a preferred embodiment of the invention, proposed thereby is a unique, unitary, monocoque, injection-molded skateboard which is characterized by an elongate composite body that takes the form of a foamed structural plastic mass, with a filler reinforcement in this mass of plural, elongate strands of selected carbon fibres.

Utilization of a structural foamed plastic material which carries such carbon reinforcing fibres, all of which composite is injection molded in what might be thought of as a "one-shot" step into a final board, offers an obviously appealing, simple, low-cost, non-machined end structure, which can demonstrate enormous strength and resilience characteristics for high performance (especially assisted by the choice and use of carbon as the fibre material), and extraordinary, related resistance to nicking damage and environmental invasion which so negatively affects the lives of conventional laminated-wood skateboards. The foamed structural nature of the end product results in a skateboard body having differentiated density which itself offers a number of significant advantages. This "differentiated density" varies from quite dense near all of the outer skin surfaces of the molded product, with progressively lower density (i.e., more void space) as one nears, so-to-speak, the central portions of the molded body. The dense outer skin regions toughly resist violent contact damage which lurks as a possibility at every "spill" or "collision" event, and the like. The foaming approach allows for selective control not only of the specific differentiated-density characteristic of the body, but also of the overall final product weight and specific gravity. Foaming also enhances resilience and springiness characteristics.

By very careful control of the nature and weight contribution (to the total mass) of the fibre strands, and of the foaming parameters and process, we have found it to be possible, through the difficult and time-consuming development of this invention, to create a unique, injection-molded skateboard body having a specific gravity in the range of about 0.75 to about 0.8 which replicates that of conventional laminated maple construction. This difficult achievement, we believe, is a "star" feature of the invention.

With the board body of the present invention formed by injection molding, hardware mounting holes are molded in place, and thus, as distinguished from drilled holes, offer at their surfaces all of the high-density desirable structural-integrity qualities that are found at all other outside exposed surface skin regions of the molded structure.

The monocoque nature of the end board product offers a unitariness which makes a skateboard constructed in accordance with the present invention virtually indestructible even in the setting of the most violent kinds of so-called normal, aggressive skateboard usage.

These and other striking and important features and advantages which are offered by the skateboard of the present invention, and by the unique process of injection-molding forming of such a skateboard, will become more fully apparent as the detailed description which now follows is read in conjunction with the accompanying drawings.

BRIEF DESCRIPTION OF THE DRAWINGS

FIG. 2 is a side elevation of the skateboard of FIG. 1 with the rear set of trucks removed.

FIG. 3 is a top plan view taken from the upper side of FIG. 2.

FIGS. 4 and 5 are end elevation taken, respectively, from the left and right sides of the view shown in FIG. 3.

DETAILED DESCRIPTION OF, AND BEST MODE FOR CARRYING OUT, THE INVENTION

Figure 1:
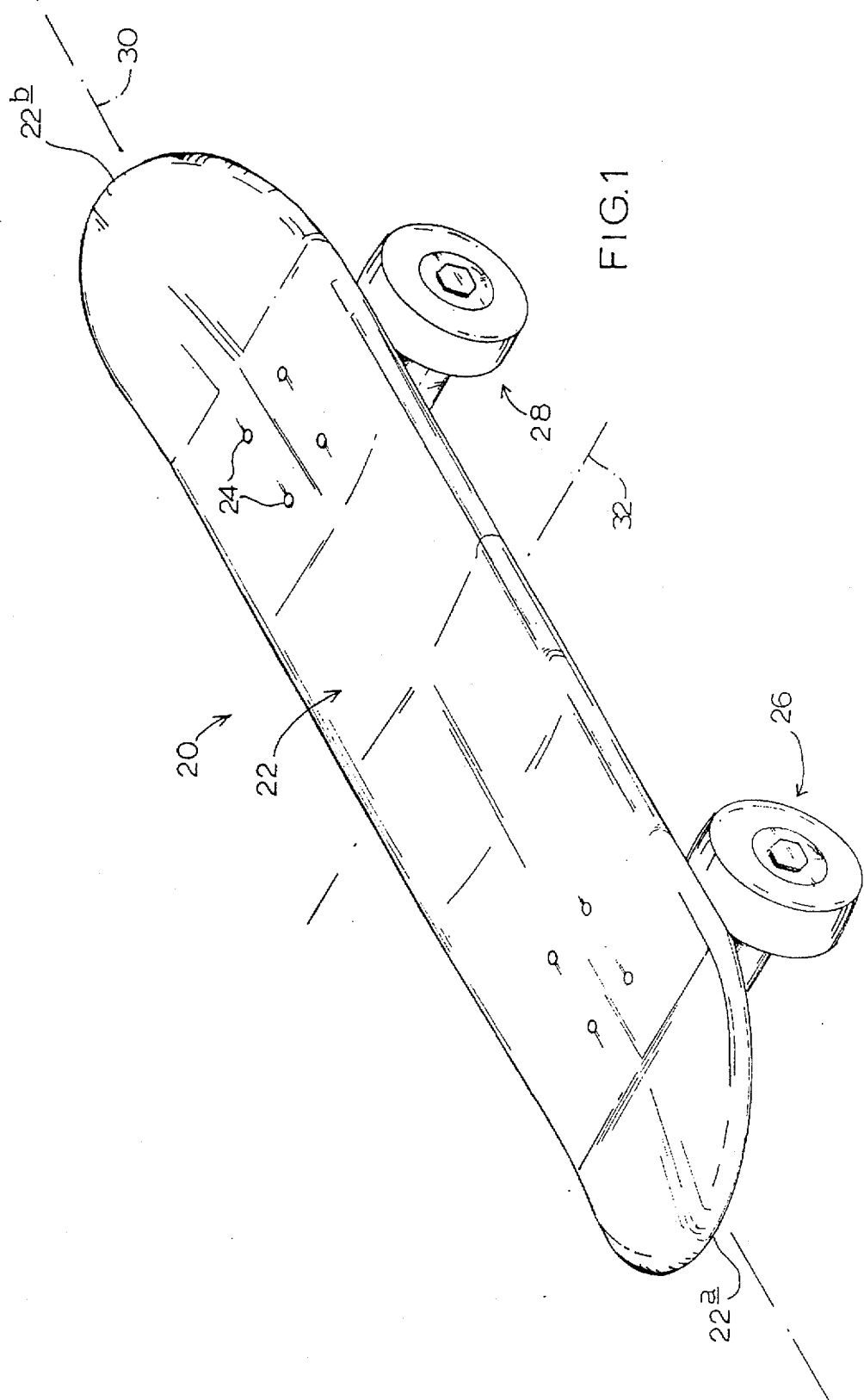
FIG. 1 is a top perspective view of a fully assembled skateboard (body and trucks) fabricated in accordance with the present invention.
Figure 6:
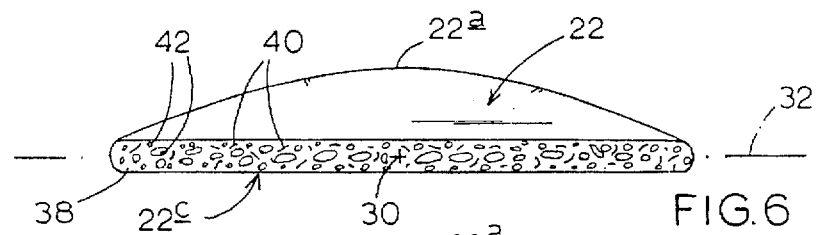
FIGS. 6, 7, 8, 9 and 10 are cross-sectional views, on a larger scale of that used in FIG. 1–5, inclusive, taken generally, along lines 6—6, 7—7, 8—8, 9—9 and 10—10, respectively, in FIG. 3. These five cross-sectional views schematically suggest, and illustrate, both the carbon fibre strand content, and the differentiated-density foamed characteristics of the skateboard of the invention.
Figure 7:
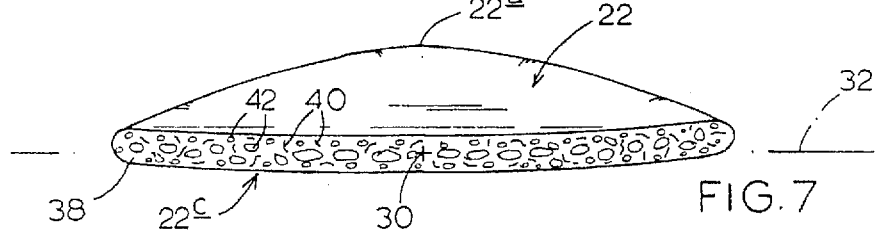
Figure 8:
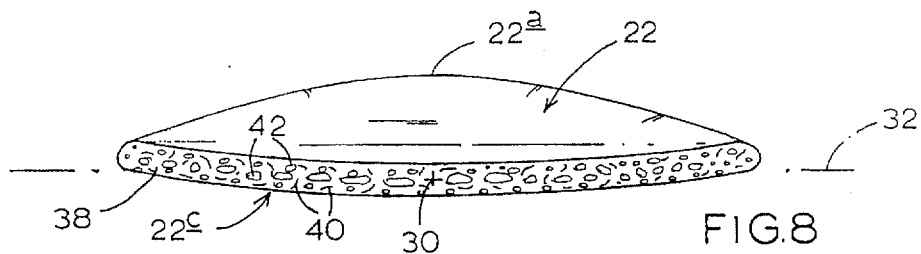
Figure 9:
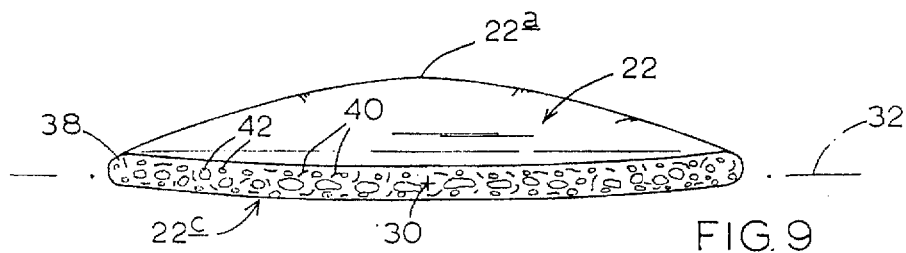
Figure 10:
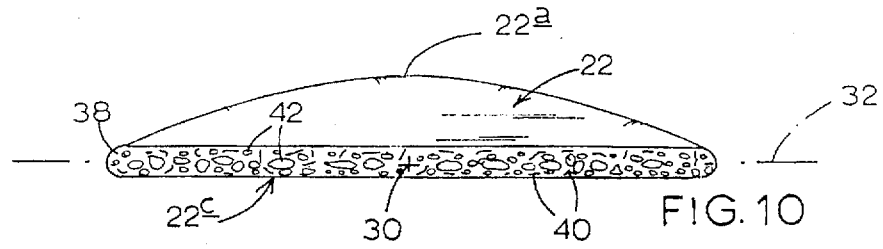

Turning attention now to the drawings, and referring first to FIG. 1, indicated generally at 20 is a fully assembled skateboard constructed in accordance with the novel process and structure of the present invention. Deceptively simple at first-glance appearance, it embodies a break-through recognition of how it is possible to identify (structurally and manufacturingly) the limitations inherent in decade-old skateboard technology, and to propose, after substantial-investment design and testing effort, a dramatic direction change in fabrication technique and in end-product character, to yield a skateboard product which will set a standard for the next evolutionary phase in this arena of sporting/recreational equipment.

Skateboard 20 includes a unitary, monocoque, injection-molded body 22, soon to be described in much greater detail, joined to the underside of which, through suitable hardware, such as the two flathead screws shown at 24, are two sets of conventional skateboard trucks 26, 28. Truck set 26 is located toward the front end 22a in body 22, and truck 28 toward the rear end 22b in the body. As is clearly suggested by surface-shade markings employed in FIG. 1, and as will become more fully apparent with a reading and viewing of the other drawing figures, body 22 is shaped with what is referred to herein as compound curvilinearity, including curvature about its longitudinal axis, shown at 30, and about its generally central transverse axis, shown at 32.

Shifting attention to FIGS. 2–10, inclusive, these figures quite fully show the curvilinear and topographical configuration of the injection-molded body of the invention. For example, the side elevation appearing in FIG. 2, wherein truck set 28 has been removed, illustrates curvature relative to longitudinal axis 30. As can be seen in this figure, the underside, or base, 22c in body 22 includes a major longitudinal central stretch 22d which extends along a substantially straight line 33 that is defined by the intersection of base 22c by a plane (parallel to the plane of FIG. 2) which contains longitudinal axis 30, and which is substantially normal to transverse axis 32. This central stretch extends essentially between the dash-double-dot lines shown at 34, 36.

The unique, unitary, monocoque skateboard body of the invention, as was mentioned earlier, is molded (in what might be thought of as a single-shot/single-step procedure) to end up with the final shape (a relatively complex shape) clearly illustrated in the drawing figures mentioned with particularity so far. Importantly, body 22 takes the form of a special composite material, including a foamed structural plastic mass having a distributed differentiated density which, throughout the entire volume of the mass, is higher adjacent all outside surface regions of the mass, and progressively lower extending inwardly in the mass relative to such outside regions. Within this plastic mass are contained plural, elongate strands of carbon fibre material distributed throughout and within the confines of the mass, with these strands contributing preferably within the range of about 5% to about 70% of the total weight of the mass.

Figure 12:
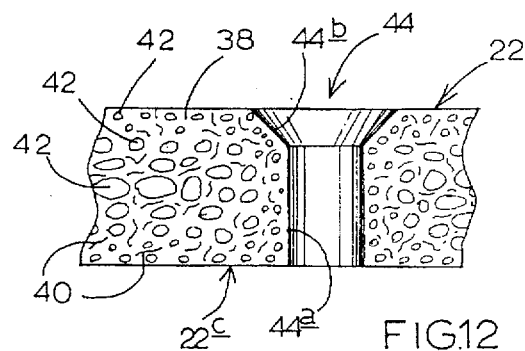
FIG. 12 is a same-scale, fragmentary, cross-sectional view taken generally along line 12—12 in FIG. 11.

Focussing attention now particularly on the cross-sectional views of FIGS. 6–10, inclusive, and also of FIG. 12, the plastic mass is shown generally at 38, and the contained strands of carbon fibre are shown generally at 40. The differentiated density is represented by the schematic utilization of circular and ovate bubbles, such as those shown generally at 42, which can be seen to be very small and widely spaced near the outside molded surface areas, and progressively larger and closer approaching interior regions of the plastic mass of the body. The resulting material density characteristic, therefore, is one wherein there is relatively high material density near the outside surface regions, and progressively, relatively lower density extending inwardly therefrom.

The plastic component of the composite body material may be either a thermoplastic or a thermoset material, but preferably is a thermoplastic material selected from the group consisting of nylon, polypropylene and polyethylene. From this group of thermoplastic materials, we have experienced a great deal of manufacturing and performance success with nylon. Foaming of this material is accomplished through the conventional use of well-known and well-understood foaming agents which are present and introduced to the mass at the time of the hot-flow injection-molding procedure. Foaming is accomplished preferably to diminish what would be the "full (unfoamed) mass" of the body, were it made of solid unfoamed material, to within a weight-reduction range of about 10% to about 50%. Thus, the foamed void space within the body preferably occupies overall volume within this same range of about 10% to about 50% of the total volume of body 22. For a large number of the most desirable performance applications, a "weight reduction" of around 37% is preferable.

The strands of carbon fibre material incorporated with the plastic mass typically have lengths that reside in the range of about 1/128th-inch to about 1-inch. A typical diameter for these carbon fibres lies in the range of about 7- to about 7.5-microns. Carbon has been chosen for the reinforcing fibre material for important reasons. For example, carbon incorporation yields a final molded product with extremely high strength and performance characteristics, without sacrificing low weight, and the opportunity to achieve a "maple-matching" specific gravity. Alternatives, such as glass, or a mix of carbon and glass, cannot offer these qualities. In a given construction, it is preferable that substantially all of the strands have essentially the same length, and a preferred length has been found to be about ¼-inch. Within the weight-contribution range mentioned earlier for the strands in the composite mass, a preferred weight contribution for most applications has been found to be about 15% of the total weight of body 22.

Utilizing specially specified (by us) "starter composite material"—pellets of nylon containing 15% (by weight) carbon fibres, with lengths of about ¼-inch —which "starter" material exhibits a specific gravity of about 1.22, we were startled, and pleasantly surprised, to learn that we could, through careful control of foaming during processing, achieve a final skateboard body with a specific gravity in the "maple-laminant range" of about 0.75 to about 0.8. And all of this without in any way sacrificing or jeopardizing important strength, resilience, etc. considerations.

Figure 11:
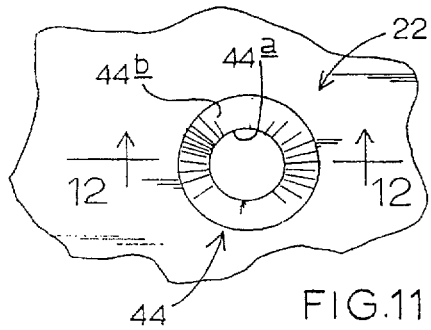
FIG. 11 is a fragmentary view on a much larger scale than that employed in all of the above-described figures, illustrating a molded, countersunk, through-body hole formed in the skateboard body in the region of embracing curved arrows 11—11 in FIG. 3, which hole is employed for receiving hardware that holds in place the rear set of trucks pictured in FIG. 1.

Addressing attention now particularly to FIGS. 11 and 12, here there is shown generally at 44 one of eight, through-body, hardware-receiving holes which are formed during the molding process, and which are defined by portions of the outside surface regions within the overall composite mass. Each of these holes includes a cylindrical length, such as length 44a which extends toward and opens to base 22c, joining at its upper end, with an angled, countersunk region, such as region 44b, for receiving the head of a conventional flathead hardware-attaching screw, such as previously-mentioned screws 24. It is important to note that these through-body holes are molded in place rather than drilled in place, and as a consequence, the surface regions that define the surface boundaries of the holes have the same high density, structural-integrity characteristics as all other "outside" surface regions in the entire composite body mass.

There is thus proposed by the present invention a special skateboard structure featuring a unique, injection-molded, composite material taking the form of foamed structural plastic containing carbon fibre strands, which structure offers a huge number of advantages over the best known wood-laminated prior art structures, with essentially none of the disadvantages of the latter. The strand-containing composite material, foamed in accordance with the teachings of the invention, and injection-molded essentially in a single, one-shot operation, offers the capability of low-cost, selectable manufacturing of a wide range of skateboard body constructions—"tuned", so-to-speak, to have the most desirable performance characteristics for different specific applications. Variations in foaming, and in fibre content (percentage and length), and injection moldability, offer a range of options simply not possible with conventional wood-laminant construction.

The end product finishes with a high-density outer surface skin which is highly damage resistant, and which, incidentally, is ideally suited for the reception of the usual surface-born graphics information—logos, etc. The finished product offers a construction having, in the context of high damage resistance, extraordinary ductility and impact-resilience performance which simply cannot be matched with prior-known conventional constructions.

While different manufacturers may choose different specific ways of implementing injection molding, we have found that a very successful creation of a skateboard body, constructed in accordance with the teachings of our invention, can be formed by injecting heated, molten, high-pressure-fed composite material blended with the appropriate foaming agent through a single entry gate/port located, for example, at the cross which is marked at 46 (in FIG. 3) located on the top surface 22f in body 22. Other injection-molding approaches may, of course, be used as well.

Thus there is described and illustrated herein a unique skateboard construction and method of making the same which offers all of the features and advantages ascribed to it hereinabove and throughout this description, while avoiding essentially all of the disabilities and drawbacks that characterize conventional, high-quality, laminated-wood construction. Accordingly, while a preferred embodiment and method of practicing the invention have been described herein, it is appreciated that variations and modifications may be made without departing from the spirit of the invention.

It is desired to claim and secure by Letters Patent:

1. A method of making a unitary, monocoque composite skateboard body comprising preparing, for an injection-molding procedure, a composite blend including a structural plastic mass, plural elongate strands of carbon fibre material distributed within such mass, and an appropriate foaming agent, and injection molding that blend into a mold cavity configured to define the final shape and configuration of such a body.

2. The method of claim 1, wherein said preparing is performed in a manner whereby the carbon fibre content contributes in the range of about 5% to about 70% of the total weight of the body, and the strands have lengths which lie in the range of about ¹⁄₁₂₈th-inch to about 1-inch.

3. The method of claim 1, wherein the amount of foaming agent selected for utilization in the prepared blend is such as to result in a final injection-molded body including void space within it which collectively occupies in the range of about 10% to about 50% of the total volume of the final body mass.

4. The method of claim 2, wherein the amount of foaming agent selected for utilization in the prepared blend is such as to result in a final injection-molded body including void space within it which collectively occupies in the range of about 10% to about 50% of the total volume of the final body mass.

5. The method of claim 3, wherein said method results in a skateboard body having a specific gravity in the range of about 0.75 to about 0.8.

6. The method of claim 1, wherein the plastic mass takes the form of a thermoplastic material.

7. The method of claim 6, wherein such thermoplastic material is selected from the group consisting of nylon, polypropylene and polyethylene.

8. The method of claim 1, wherein the plastic mass takes the form of a thermoset material.

* * * * *